US012355627B2

(12) United States Patent
Sattiraju et al.

(10) Patent No.: US 12,355,627 B2
(45) Date of Patent: Jul. 8, 2025

(54) NETWORK TOPOLOGY PROVIDING A SEAMLESS TRANSITION BETWEEN LEVELS

(71) Applicant: Cisco Technology, Inc., San Jose, CA (US)

(72) Inventors: Srinivas Siva Kanth Sattiraju, Long Grove, IL (US); Irina Alexandra Dumitru, Bucharest (RO); Daniel Michael Rotondo, Austin, TX (US); Carlos Javier Campos Torres, Miami Shores, FL (US); Juan Carlos Pontaza, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 264 days.

(21) Appl. No.: 17/977,090

(22) Filed: Oct. 31, 2022

(65) Prior Publication Data

US 2024/0146613 A1    May 2, 2024

(51) Int. Cl.
*H04L 41/12* (2022.01)

(52) U.S. Cl.
CPC .................... *H04L 41/12* (2013.01)

(58) Field of Classification Search
None
See application file for complete search history.

(56) References Cited

U.S. PATENT DOCUMENTS

| 8,185,824 | B1 | 5/2012 | Mitchell et al. |
| 11,265,224 | B1* | 3/2022 | Bogado .................. H04L 41/40 |
| 2010/0005058 | A1 | 1/2010 | Tago et al. |
| 2011/0161378 | A1 | 6/2011 | Williamson |
| 2012/0323814 | A1 | 12/2012 | Klein et al. |
| 2018/0330328 | A1* | 11/2018 | Cheek .................. G06Q 10/105 |
| 2019/0278483 | A1 | 9/2019 | Mahmood et al. |
| 2019/0377463 | A1* | 12/2019 | Fletcher .................. H04L 41/22 |

* cited by examiner

*Primary Examiner* — Fadi Haj Said
(74) *Attorney, Agent, or Firm* — Lee & Hayes, P.C.

(57) ABSTRACT

Techniques and architecture are described that provide a multi-platform tool focused on displaying various levels of a topology of a network to a user while maintaining an original context of the user that was initially selected. Elements within the topology are dynamically added or removed from the user's view, e.g., the display, as the elements come in and out of focus. For example, in configurations, as the user traverses the topology, e.g., graph, the nodes that are not of interest generally become invisible. Thus, the user receives a clear view of how the selected component changed according to the user's actions and may achieve an easily maintained history of the current hops through the network topology.

20 Claims, 12 Drawing Sheets

NETWORK TOPOLOGY PROVIDING A SEAMLESS TRANSITION BETWEEN LEVELS

TECHNICAL FIELD

The present disclosure relates generally to generating and displaying network topologies, and more particularly, to generating and displaying network topologies providing a seamless transition between levels within a network's hierarchy while maintaining a user's context.

BACKGROUND

Data centers within networks each aggregate numerous assets, e.g., sites, fabrics, switches, routers, etc. This is true within the physical layer, as well as the various virtual private networks (VPNs), virtual machines (VMs), virtual local area networks (VLANs) etc., on the virtual layer. For a precise comprehension of all the constituent objects and connectivity within and across data centers, techniques such as, for example, drawing a topology, made up of network graphs, may be used. The topology map may typically comprise nodes and edges. At a data center level, sites and fabrics, e.g., the higher level of order within the topology, are associated to nodes and edges. When these nodes and edges are selected, they are comprised of a multitude of other second and third level objects, thereby exhibiting a hierarchical structure.

Given the inherent hierarchy at a particular level (nodes and edges), it is essential that the transitions between higher level to lower level and vice versa are made in a seamless and intuitive manner by preserving the viewer's context. In many cases, this is not achieved. For example, the transition from one level to another is generally presented to the user in a legacy manner, e.g., redrawing the entire graph for each click on anode or edge. Thus, the user generally gets detached from the initially selected component within the topology. Additionally, as more and more objects are displayed, the objects become smaller and smaller making it harder for the user to comprehend and glean information from.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
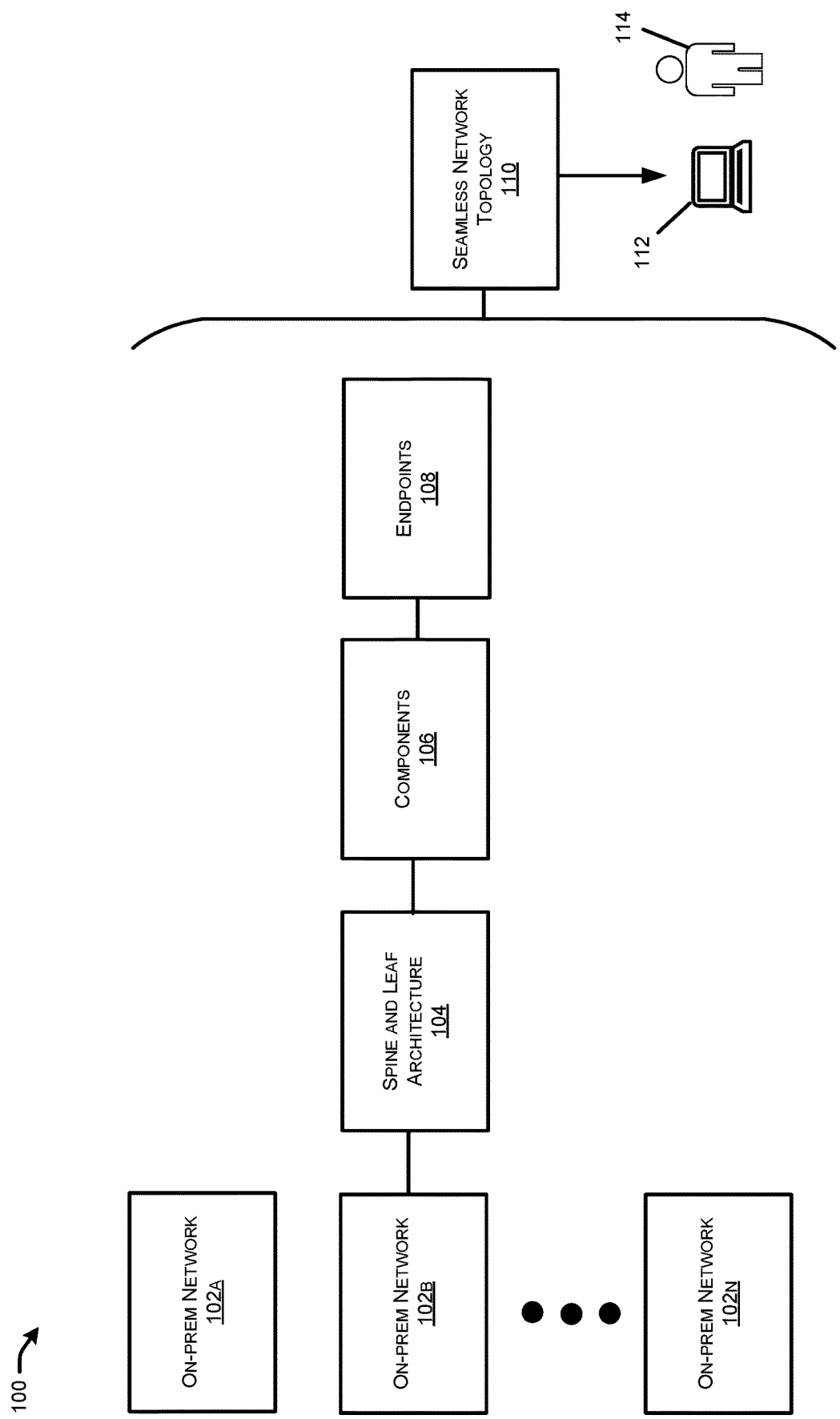
FIG. 1 schematically illustrates an example of a portion of a network where a seamless network topology may be created with respect to the network, in accordance with the techniques and architecture described herein.

The present disclosure describes techniques and architecture that provide a multi-platform tool focused on displaying various levels of a topology of a network to a user while maintaining an original context of the user that was initially selected. The techniques and architecture achieve seamless transitions between levels while preserving context, thereby providing a user with a richer, more coherent experience that is strongly coupled to the component within the network topology, e.g., network node, initially selected by the user. More particularly, due to the existence of various levels at which a network may be observed, the aspects of achieving seamless transitions and maintaining the user's context are tightly intertwined. Thus, elements within the topology need to be dynamically added or removed from the user's view, e.g., the display, as the elements come in and out of focus. For example, in configurations, as the user traverses the topology, e.g., graph, the nodes that are not of interest generally become invisible. Thus, the user receives a clear view of how the selected component changed according to the user's actions and may achieve an easily maintained history of the current hops through the network topology.

As an example, a method may include displaying, on a display of a user device of a user, a first level of a topology of a network, receiving a first input signal from the user device indicating a selection of a first node of a plurality of first nodes of the first level of the network, and in response to the first input signal, displaying a second level of the topology and a third level of the topology relative to the first node. The method may further include receiving a second input signal from the user device indicating a selection of a second node of a plurality of second nodes of the third level of the topology in which the user is interested, and in response to the second input signal, displaying a fourth level of the topology of the network relative to the first node. The displaying the fourth level of the topology of the network may comprise displaying (i) only the second node of the plurality of second nodes and (ii) the fourth level of the topology of the network, wherein the fourth level of the topology comprises a plurality of third nodes coupled to the second node.

EXAMPLE EMBODIMENTS

In accordance with configurations, a topology of a network may be described and displayed on a user device of a user as a seamless network topology, e.g., a network graph or topology map, that seamlessly transitions among various levels of the network topology while maintaining the user's context. The network topology may display site-to-site connections. The onsite connections may include one or more on-premises (on-prem) networks. In configurations, one or more of the on-prem networks may be configured as a data center. The user may select a first on-prem network by interacting with the first on-prem network node via a user interface (UI) that provides an input signal that may then display options to the user such as, for example, site details, a drill down function, e.g., drill down from the first on-prem network within the network topology, mark as a favorite, etc. If the user, for example, selects to drill down, then the first on-prem network may be displayed in greater detail.

As an example, the next level of the network topology may be an illustration of nodes in the form of spines that are coupled to a third level in the form of leaves. In configurations, the second level of spines may be displayed as simply a group of spines that is connected to each of the four leaves. However, in configurations, the user may select, e.g., interact via the UI with the spine node by clicking on the spine node representing the group of spines, which may then expand the spines into individual spines with each spine connected to the corresponding leaves. The user may then interact with the four spines to collapse them back into a group of spines. As another example, if the user selects site details via interaction with the UI, site details may be displayed for the selected site that may provide various pieces of information with respect to anomaly levels, advisory levels, general information, a traffic amount, a number of interfaces, and connectivity information, as well as inventory within the site.

In configurations, the user may select one of the leaves by interacting with a leaf via the UI, which may then provide options for the user such as, for example, providing leaf details, drilling down further within the network topology, marking as a favorite, etc. If the user selects the leaf details, then details regarding the specific leaf may be displayed to the user. The information may display various pieces of information such as anomalies with respect to the leaf, advisory levels, a number of interfaces, connectivity information, inventory, etc.

If the user selects to drill down from a particular leaf, then the network topology may display a fourth level of nodes that are coupled to the selected leaf. For clarity, the other leaves, e.g., the non-selected leaves, may be removed from the display of the network topology. In configurations, the nodes coupled to the leaf may represent types of components. For example, one node may represent servers while another node may represent routers. Other examples of nodes may include switches, endpoints (e.g., Kubernetes), etc.

If the user selects one of the nodes for expansion, then the selected group node may be expanded. For example, if the group node represents node types in the form of servers, by selecting the server node in the fourth level of the network topology, then the server node may be expanded into, for example, three servers. In configurations, the routers node, the switches node and the endpoints node may still be displayed. However, in other configurations, those nodes may be removed from the display within the network topology.

In configurations, the user may select one of the servers via the UI and options may be provided such as, for example, displaying server details, drilling down further within the network topology, marking the server as a favorite, etc. If, for example, the server details option is selected, then the network topology may display information related to, for example, anomaly level health of the server, advisory levels, connectivity, general information related to the server, e.g., model number, type, reboot information, IP addresses, etc. The information may be displayed in a page format or a table format.

In configurations, if the drill down option is selected, then the server may be the only node displayed within the fourth level and all other nodes within the fourth level, e.g., the other servers, the switches node, the routers node, the endpoints node, may be removed from the network topology display. The endpoints to which the server is connected downstream may be displayed. In configurations, only the first few of the endpoints may be displayed while the rest of the endpoints may be grouped together as a single node. If the user selects one of the individual nodes, then information related to the node may be provided in a page format or table type format. If the group endpoints node is selected, then a page or table may be displayed that displays information relating to the endpoints within the group such as, for example, a status with regard to anomaly level, a device name, IP/MAC address, a type of endpoints, an endpoints group, a VLAN ID, etc.

Additionally, in configurations, a backtrace function may be provided such that when the particular server within the level is selected, all upstream parent nodes that have connectivity to the node may be displayed. For example, if a server within the fourth level is selected, then, if the first leaf and the third leaf of the third level are connected to the selected server then the first leaf and the third leaf may be displayed within the network topology illustrating that the leaves are connected to the spines upstream and are connected to the second server downstream.

In configurations, when the user is using a user interface such as a mouse to manipulate a pointer within the displayed network topology, when the user hovers over a particular node, e.g., the pointer hovers over a node within the network topology, then information related to the particular node may be displayed. For example, the information may be displayed related to the health of the node, upstream connections, downstream connections, health of upstream (parent) nodes, health of downstream (children) nodes, etc.

In configurations, the network topology may be displayed to the user in different manners with respect to the network components. For example, in a first configuration, the network topology may be displayed to the user in inventory form, e.g., the nodes may be displayed as spines, leaves, various components such as servers, routers, switches, endpoints, etc. and then the ultimate endpoints. In a second configuration, the network topology may be displayed to the user in the form of IP connectivity, e.g., inter-site nodes, virtual routing and forwarding (VRF) nodes, subnets, and the ultimate endpoints.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example portion of a network 100. The example portion of the network 100 includes multiple on-premises (on-prem) networks 102a-102n (collectively referred to herein as on-prem networks 102). In configurations, one or more of the on-prem networks 102 may be configured as a data center.

The on-prem networks 102 may be configured in a variety of ways. For example, one or more of the on-prem networks 102 may be configured with a spine and leaf architecture 104. The spine and leaf architecture 104 may provide connections to various components 106, e.g., servers, routers, switches, endpoints (e.g., Kubernetes), etc. Ultimate endpoints 108 within the on-prem networks 102 are connected to the various components 106.

In configurations, a seamless network topology 110 may be created by a computing device (not illustrated) with respect to the network 100. The seamless network topology 110 may be displayed on a display of a user device 112 of a user 114. The user 114 may interact with user interfaces (UIs) within the seamless network topology 110 to navigate the seamless network topology 110 and observe information regarding various parts of the seamless network topology 110. As will be described herein, examples of types of nodes that may appear in the seamless network topology 110 include sites (grouped by their manufacturer), switches (e.g., spines, leaves, remote-leaves, sub-leaves, routers, access switches, etc.), servers, endpoints (e.g., physical endpoints, virtual endpoints—grouped by manufacturer, e.g., VMWare, Red Hat, Kubernetes, etc.), devices, etc.

Figure 2A:
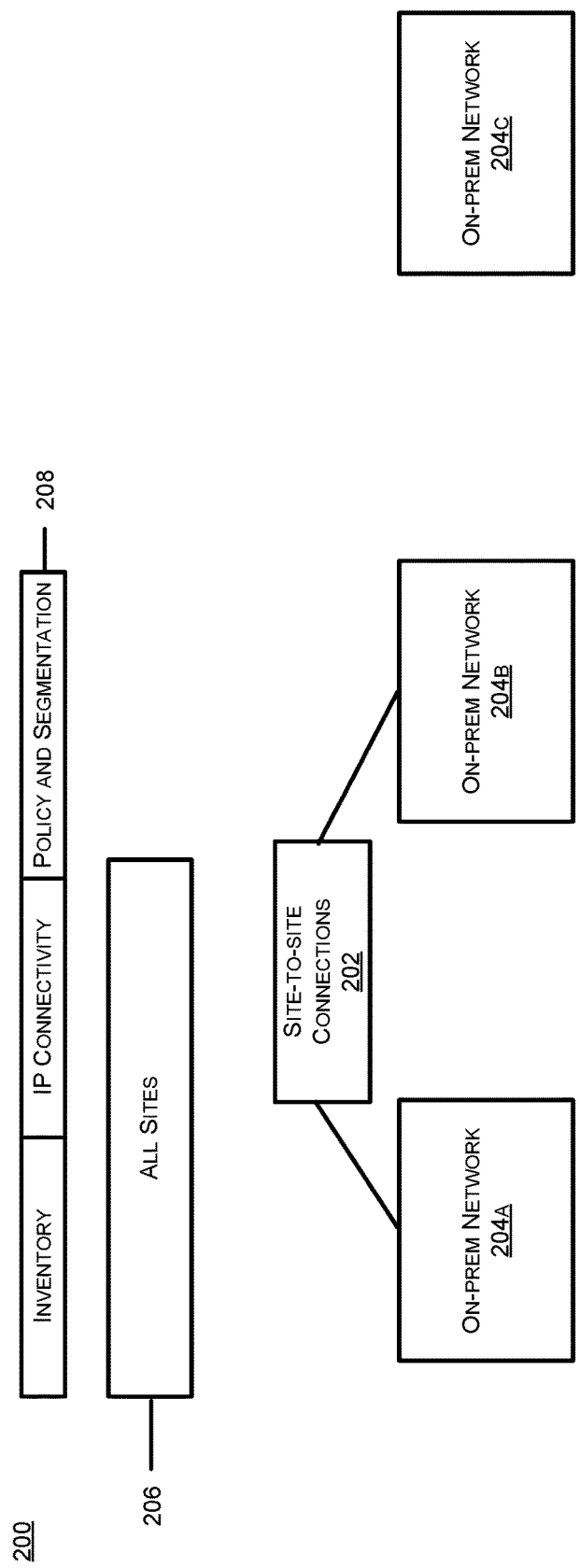
FIGS. 2A-2F schematically illustrate an example of various levels of a network topology as the various levels may be displayed on a user device, in accordance with the techniques and architecture described herein.

In particular, referring to FIG. 2A, in accordance with configurations, the techniques and architecture described herein provide a network topology 200 (e.g., seamless network topology 110) of a network, e.g., network 100, that may be described and displayed on a user device, e.g., user device 112, of a user as, for example, a network graph or topology map. The network topology 200 may display site-to-site connections 202. The site-to-site connections 202 may be with respect to one or more on-premises (on-prem) networks 204. In the example, the network topology 200 includes two on-prem networks 204a, 204b coupled by the site-to-site connections 202, with a third on-prem network 204c not connected to other on-prem networks 204 via the site-to-site connections. More or fewer on-prem networks 204 may be included in the network topology 200 depending on the network. In configurations, one or more of the on-prem networks 204 may be configured as a data center.

In configurations, the network topology 200 includes a map 206 that lists the components of the network within the network topology 200 that are currently being displayed, e.g., where within the network topology 200 the user 114 currently is viewing. The network topology 200 may also include a menu 208 for selecting a format in which the network topology 200 may be displayed. For example, the menu 208 may include Inventory, IP Connectivity, and Policy and Segmentation. The menu 208 exhibits different explicit views of topology, in which nodes represent three points of view of a network, i.e., in Inventory, nodes represent physical objects and connections, in IP Connectivity, nodes represent logical network segments and connections, and in Policy and Segmentation, the nodes exhibit segmentation objects and enforced policies in their respective network, preserving the context of the initial reference point across the views.

In configurations, the user 114 may select the first on-prem network 204a by interacting with the first on-prem network node 204a via a user interface (UI) that provides an input signal that may then display options to the user 114 on the user device 112 such as, for example, site details, a drill down function, e.g., drill down from the first on-prem network 204a within the network topology 200, mark as a favorite, etc.

Figure 2B:
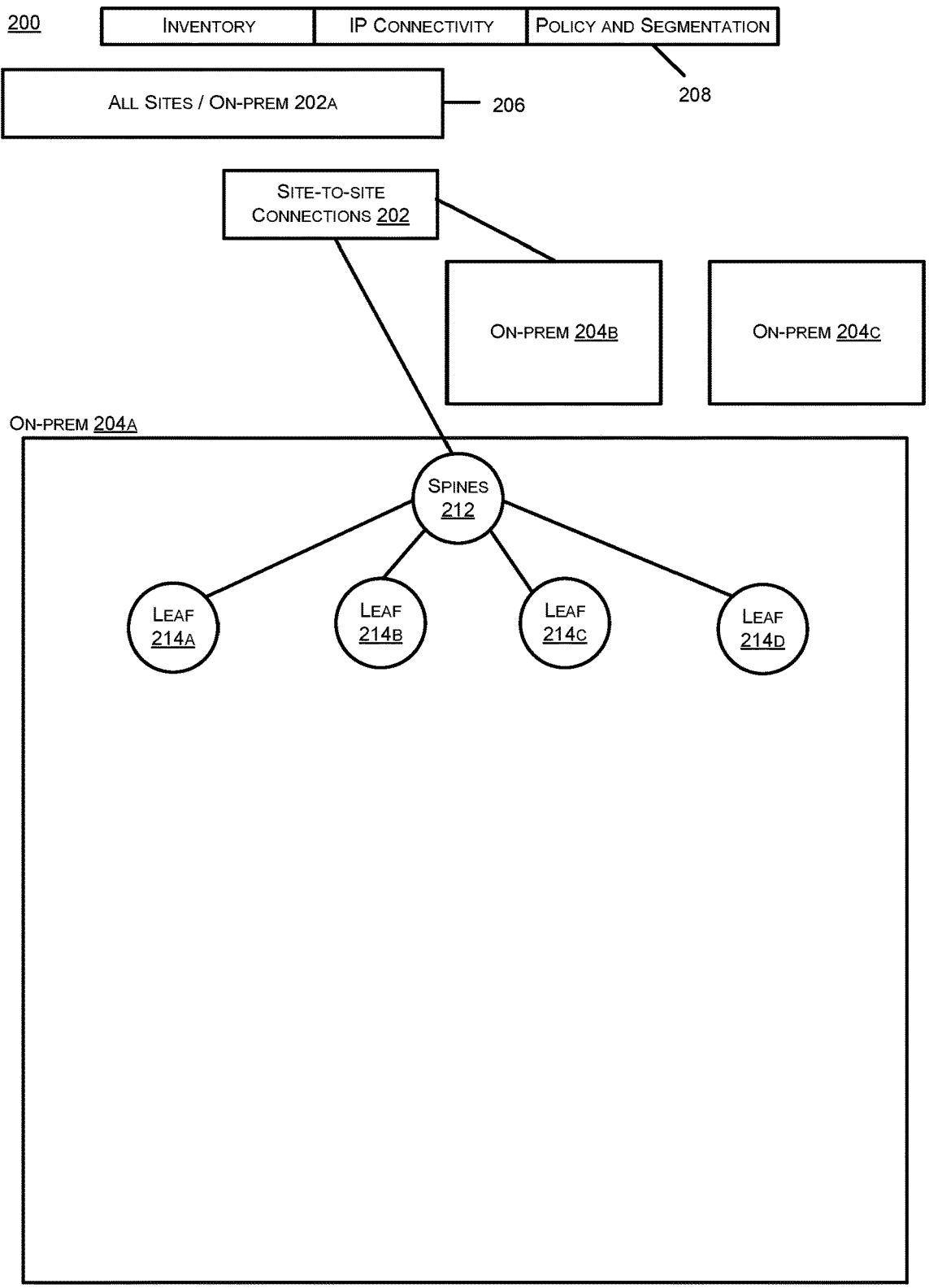

If the user 114, for example, selects to drill down, then the first on-prem network 204a may be displayed in greater detail. Referring to FIG. 2B, in this example, the next level of the network topology 200 may be an illustration of nodes in the form of spines 212 that are coupled to a third level in the form of leaves 214. In configurations, the second level of spines 212 may be displayed as simply a group of spines 212 that is connected to each of the four leaves 214. However, in configurations, the user 114 may select, e.g., interact via a UI with the spine node 212 by clicking on the spine node 212 representing the group of spines 212, which may then expand the spines 212 into individual spines (not illustrated) with each spine 212 connected to the respective leaves 214. The user 114 may then interact with the four spines 212 to collapse them back into a group of spines 212, as illustrated in FIG. 2B.

As another example, if the user 114 selects site details for the on-prem network 204a via interaction with the UI, site details may be displayed on the user device 112 for the on-prem network 204a that may provide various pieces of information with respect to anomaly levels, advisory levels, general information, a traffic amount, a number of interfaces, and connectivity information, as well as inventory within the on-prem network 204.

Figure 2C:
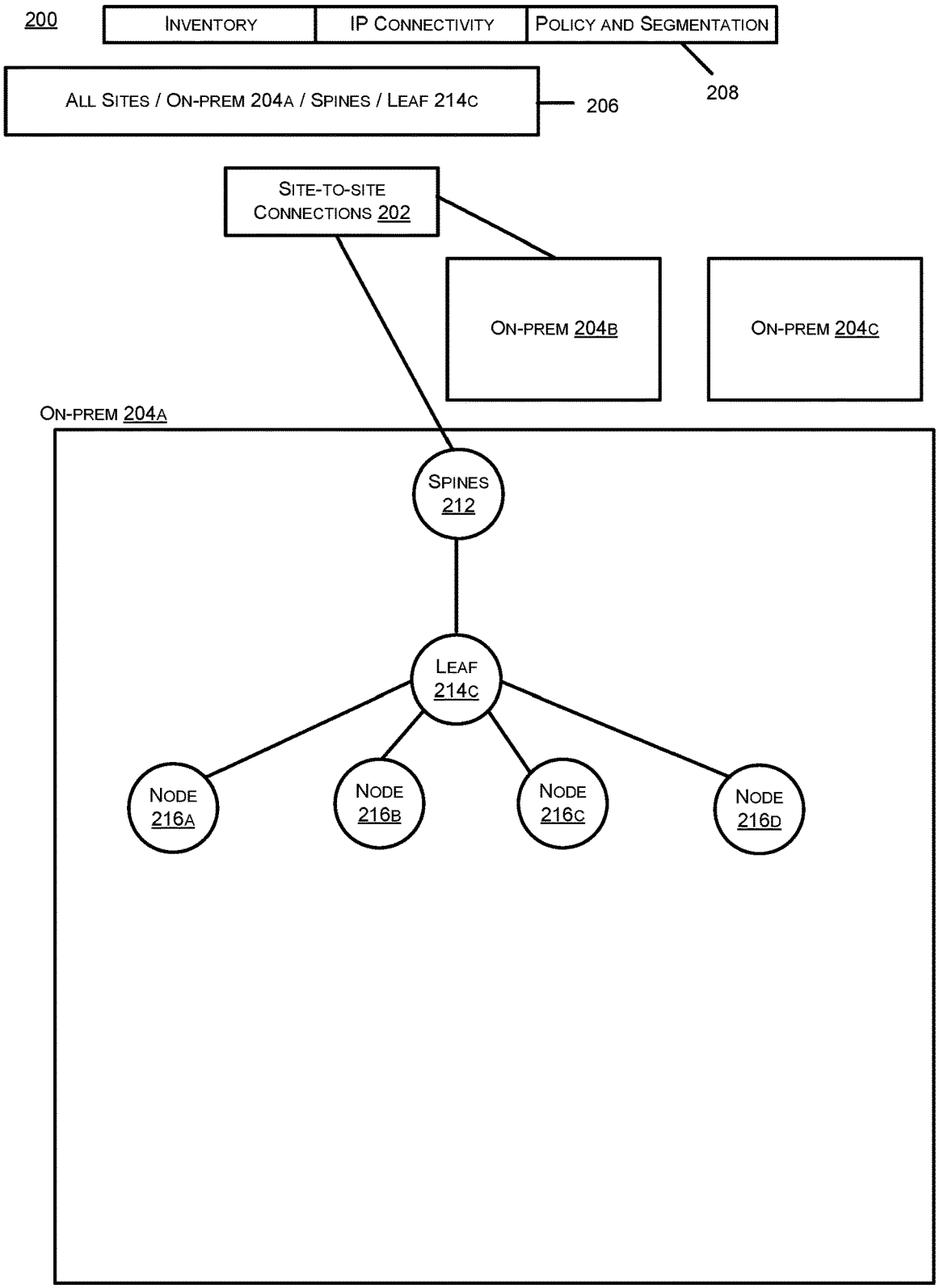

Referring to FIG. 2C, in configurations, the user 114 may select one of the leaves 214 by interacting with a leaf, e.g., leaf 214c, via a UI, which may then provide options for the user 114 such as, for example, providing leaf details, drilling down further within the network topology 200, marking as a favorite, etc. If the user 114 selects the leaf details, then details regarding the leaf 214c may be displayed to the user 114 on the user device 112. The information may display various pieces of information such as anomalies with respect to the leaf 214c, advisory levels, a number of interfaces, connectivity information, etc.

If the user 114 selects to drill down from the leaf 214c, then the network topology 200 may display a fourth level of nodes 216 that are coupled to the leaf 214c. For clarity, the other leaves, e.g., the non-selected leaves 214a, 214b, and 214d, may be removed from the display of the network topology 200. In configurations, the nodes 216 coupled to the leaf 214c may represent component types. For example, node 216a may represent servers while node 216b may represent routers. Other examples of nodes may include switches, endpoints (e.g., Kubernetes), etc. Thus, in configurations, node 216c may represent switches while node 216d may represent endpoints (e.g., Kubernetes). In configurations, the number of components represented by the node 216 may be displayed.

Figure 2D:
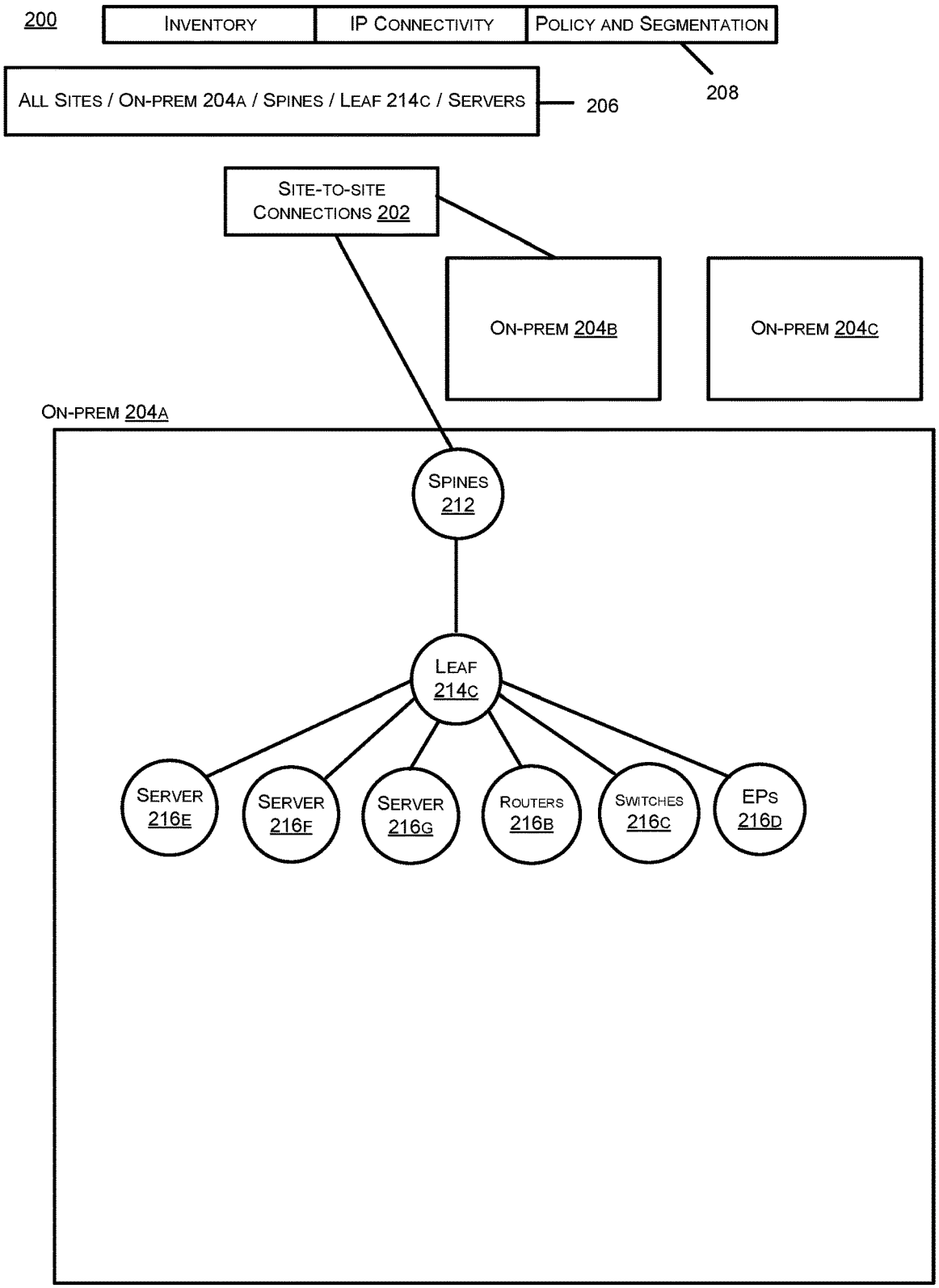

Referring to FIG. 2D, if the user selects node 216a for expansion, then the selected node 216a may be expanded. For example, since the selected group node 216a represents component types in the form of servers, by selecting the server node 216a in the fourth level of the network topology 200, then the server node 216a may be expanded into, for example, three server nodes 216e, 216f, and 216g each representing a server. In configurations, the routers node 216b, the switches node 216c and the endpoints node (e.g., Kubernetes) 216d may still be displayed. However, in other configurations, those nodes, 216 b, 216c, 216d, may be removed from the display within the network topology 200.

In configurations, the user 114 may select one of the server nodes 216e, 216f, 216g via a UI and options may be provided such as, for example, displaying server details, drilling down further within the network topology 200, marking the server as a favorite, etc. If, for example, the server details UI is selected, then the network topology 200 may display information related to, for example, anomaly level health of the server, advisory levels, connectivity, general information related to the server, e.g., model number, type, reboot information, IP addresses, etc. The information may be displayed in a page format or a table format.

Figure 2E:
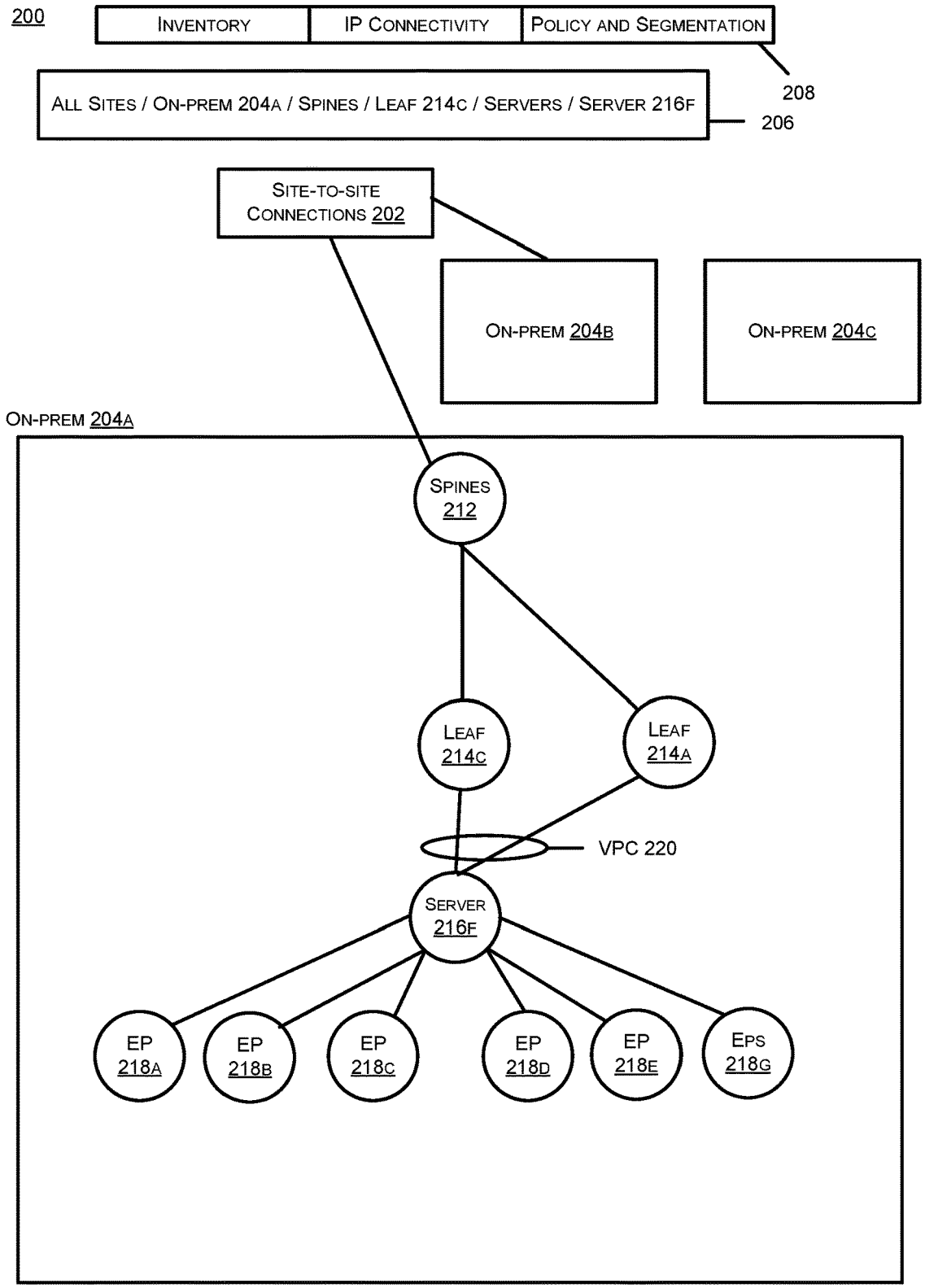

Referring to FIG. 2E, in configurations, if the drill down option is selected for a server node, e.g., server node 216f, then the server node 216f may be the only node displayed within the fourth level of the network topology 200 and all other nodes within the fourth level, e.g., the other server nodes 216e, 216g, the switches node 216b, the routers node 216c, the endpoints node 216d, may be removed from the display of the network topology 200. The endpoint nodes 218a-218g to which the server node 216f is connected downstream may be displayed. In configurations, only the first few of the endpoint nodes 218a-218f may be displayed while the rest of the endpoints 218 may be grouped together as a single node, e.g., endpoint node 218g. If the user 114 selects one of the individual endpoint nodes 218, then information related to the selected endpoint node may be provided in a page format or table type format. If the group endpoint node 218g is selected, then a page or table may be displayed that displays information relating to the endpoints within the group such as, for example, a status with regard to anomaly level, a device name, IP/MAC address, a type of endpoint, an endpoint group, a VLAN ID, etc.

Additionally, in configurations, a backtrace function may be provided such that when the particular server node, e.g., server node 216f, within the level is selected, all upstream parent nodes that have direct connectivity to the server node 216f may be displayed. For example, if since server node 216f within the fourth level is selected, then, if the first leaf 214a and the third leaf 214c of the third level are connected to the selected server node 216f, then the first leaf 214a and the third leaf 214c may be displayed within the network topology 200 illustrating that the leaves 214a, 214c are connected to the spines 212 upstream and are connected to the second server node 216f downstream. In addition, if the two leaves, 214a and 214c, are part of a Virtual Port Channel (VPC) 220, an ellipse over the edges may be drawn, showing that these two connections are configured to appear as a single Port Channel (PC).

Figure 2F:
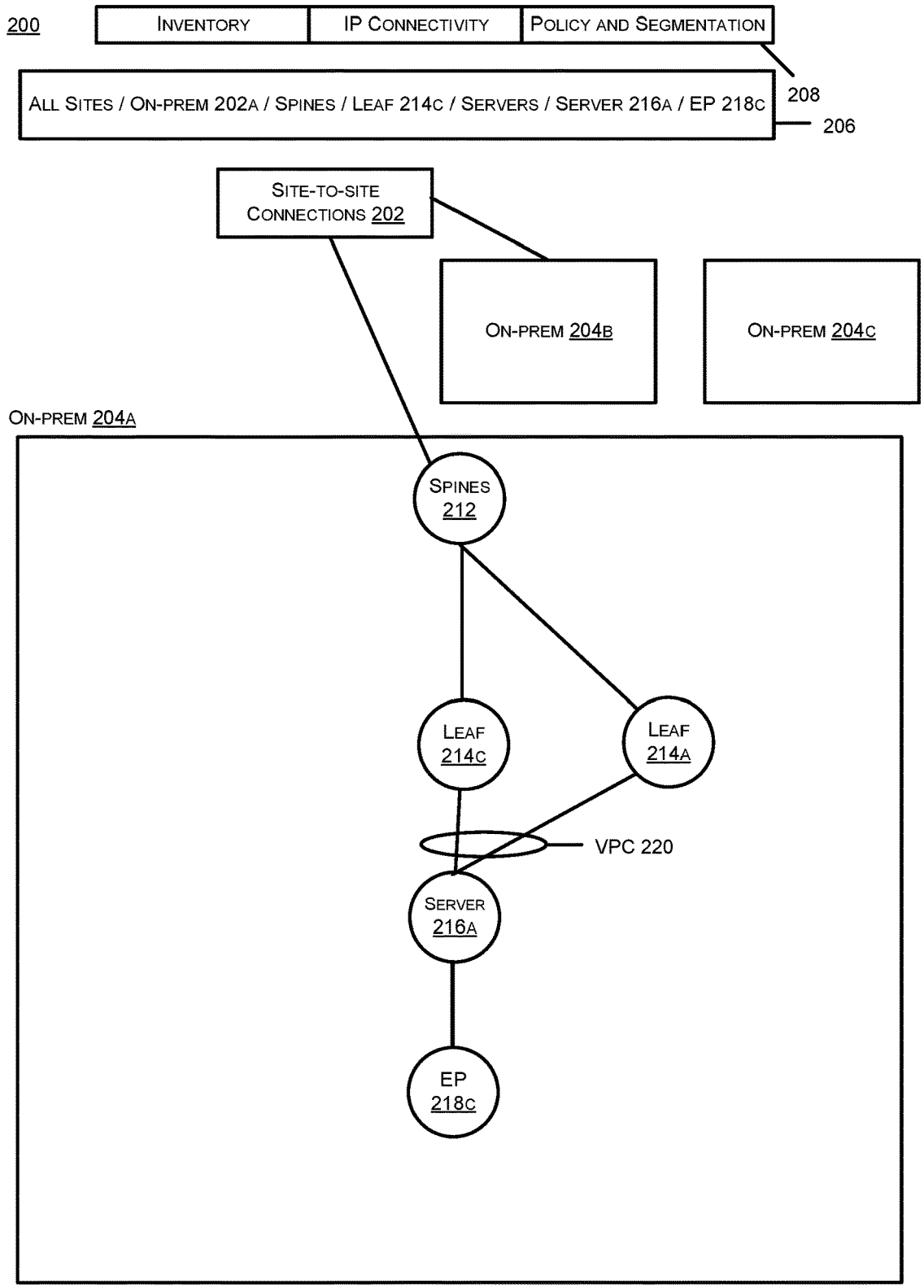

Referring to FIG. 2F, the user may elect to have a particular endpoint node 218 focused, e.g., be the only endpoint node displayed. In the example of FIG. 2F, the endpoint node 218c may be focused. Additionally, information pertaining to a particular endpoint 218 may be displayed if a particular endpoint 218 is selected by the user 114 for such information.

In configurations, when the user 114 is using an input device such as a mouse to manipulate a pointer within the displayed network topology 200 on the user device 112, when the user 114 hovers the pointer over a particular node, e.g., the pointer hovers over a node within the network topology 200, then information related to the particular node may be displayed. For example, the information may be displayed related to the health of the node, upstream connections, downstream connections, health of upstream nodes, health of downstream nodes, etc.

In configurations, the network topology 200 may be displayed to the user in different manners with respect to the network components. For example, as has been described herein as an example, in a first configuration, the network topology 200 may be displayed to the user 114 on the user device 112 in inventory form, e.g., the nodes may be displayed as spines 212, leaves 214, nodes 216 representing various components such as servers, routers, switches, endpoints (Kubernetes), etc. and then the ultimate endpoints of the network topology 200. In a second configuration, the network topology 200 may be displayed to the user in the form of IP connectivity, e.g., inter-site nodes, virtual routing and forwarding (VRF) nodes, subnets, and the ultimate endpoints.

Figure 3:
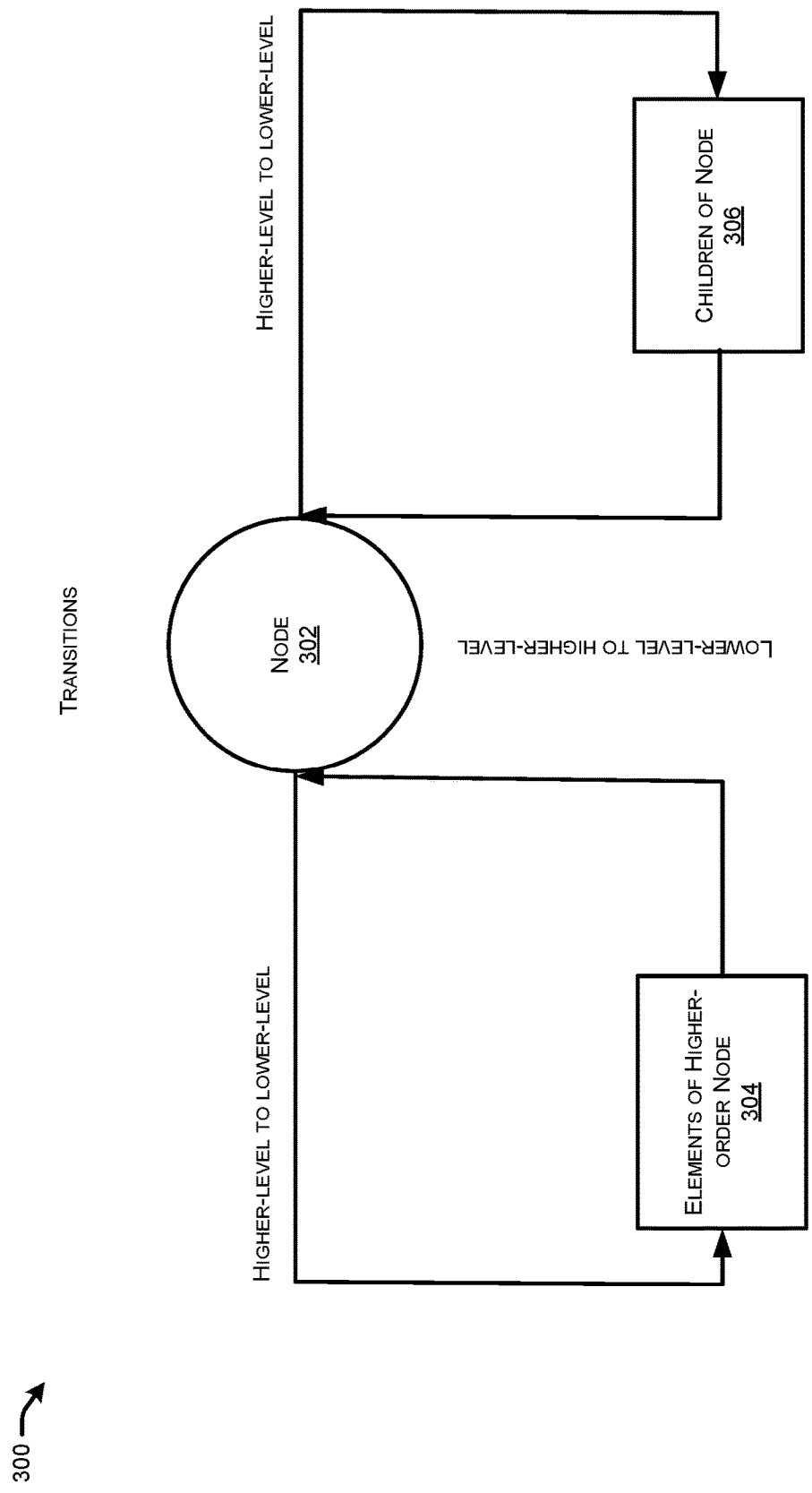
FIG. 3 schematically illustrates an example of mathematical modeling of state transitions, which may be described for creating the seamless network topology, in accordance with the techniques and architecture described herein.

Referring to FIG. 3, an example 300 of mathematical modeling of state transitions may be described for creating the seamless network topology 200. Two types of transitions are performed to create the various example views of the network topology 200 illustrated in FIGS. 2A-2F. In particular, a higher order element (node 302) is decomposed into multiple lower order elements at 304 (and vice-versa) and traversing a path in the network topology 200 implies a node's "children" to be shown or hidden at 304, depending on the type of traversing within the network topology 200, e.g., drilling down to lower levels and moving up to higher levels.

A transition from a higher-level to a lower-level and vice-versa is generally an action driven by a click-event, e.g., the user 114 using a mouse with the user device 112 to interact with a UI in the displayed network topology 200 to provide an input signal. Thus, the previously described action is a transition from an initial state $S_i$ to another state $S_f$ of the topology, noted as: $S_i \rightarrow S_f$. A state $S_n$ of the network topology 200 may be defined as a tuple comprising nodes and their associated edges $S_n = (N_n, E_n)$, where $N_n$ represents a set N of nodes in the $n^{th}$ state, and $E_n$ represents a set E of edges associated with these nodes in the $n^{th}$ state. Thus, a transition $S_i \rightarrow S_f$ may be defined as: $(N_i, E_i) \rightarrow (N_f, E_f)$ being characterized by the type of transition, e.g., (i) transition from a higher-level within the network topology 200 to a lower-level within the network topology 200 and (ii) transition from a lower-level within the network topology 200 to a higher-level within the network topology 200.

When transitioning from a higher-level within the network topology 200 to a lower-level within the network topology 200, e.g., the user 114 clicks on node n,
   (i) The node n is a higher-order object (e.g., an on-prem network 102), comprising numerous nodes N and edges E internally: n=(N, E) where n∈$N_i$:
      1. N⊄$N_i$—the initial state does not include the internal nodes of node n;
      2. N⊆$N_f$—all the internal nodes N of node n are part of the final state; thus
      3. $N_f$=($N_i$−{n})∪N—the final state includes the nodes of the initial state, except the node n, which is replaced by the internal nodes of the node n, i.e., N.
   (ii) The node n is a leaf 214 in the current state and the leafs children, defined as the set C(n), are yet to be rendered: ∄(n, x)∈$E_i$, such that ∀x∈C(n) and C(n) ⊄$N_i$, i.e., node n has no downlink connections to any node x, such that these nodes x are part of node n's children and node n's children are not part of the initial state. L(n) may be defined as the set of nodes that have the same parent as the node n (i.e., are on the same level as node n) ∃p such that (p, n)∈$E_i$, and ∃(p, y)∈$E_i$ such that ∀y∈L(n) and y≠n, i.e., there is a node p in the initial state, that has downlink connections to the node n, but also to some other nodes y, different from the node n, such that all nodes y are part of L(n).
      1. C(n)⊄$N_i$ and C(n)⊆$N_f$—the initial state does not include the children of node n;
      2. L(n)⊆$N_i$ and L(n)⊄$N_f$—the nodes that have the same parent as the node n are part of the initial state, but not of the final state; thus
      3. $N_f$=($N_i$−L(n))∪C(n).—the final state includes the initial nodes, except the nodes that have the same parent as the node n, plus the children of the node n.

When transitioning from a lower-level within the network topology 200 to a higher-level within the network topology 200, e.g., the user 114 clicks on an element that lets the user 114 go back to a certain view in the network topology 200.

(i) The elements composing a higher-order object (e.g., an on-prem network 102) may be replaced by a single element (e.g., the datacenter): $(N, E) \rightarrow n$, where $n \in N_f$:
1. $N \subseteq N_i$—all the internal nodes of node n are part of the initial state;
2. $N \not\subseteq N_f$—the final state does not include the internal nodes of node n; thus
3. $N_f = (N_i - N) \cup \{n\}$—the final state includes the initial nodes, except the nodes comprising the node n, the node n replacing these internal nodes.

ii) The user wants to go back to a level where the selected node is a leaf 214: $\nexists (n, x) \in E_f$, i.e., node n has no downlink connections in the final state. A set $S(n)$ may be defined as the set of nodes that are n's successors (not only the children of the leaf, but all subsequent children present in the topology):
1. $S(n) \subseteq N_i$ and $S(n) \not\subseteq N_f$—the node n's successors are present in the initial state, but not in the final state of the topology;
2. $L(n) \not\subseteq N_i$ and $L(n) \subseteq N_f$, where $L(n)$ is the set of nodes with the same parent as the node n—this set of nodes is not present in the initial state, but is present in the final state; thus
3. $N_f = (N_i - S(n)) \cup L(n)$, i.e., the final state includes the initial nodes, except node n's successors, plus the nodes that have the same parent as the node n.

Along these lines, the interdependency between preservation of context and seamless transitions is demonstrated i.e., to correctly represent a transition, both previous and current states of the network topology 200 are needed, and to maintain the context across different user actions, seamless transitions are needed to ensure clarity of the network representation.

Figure 4:
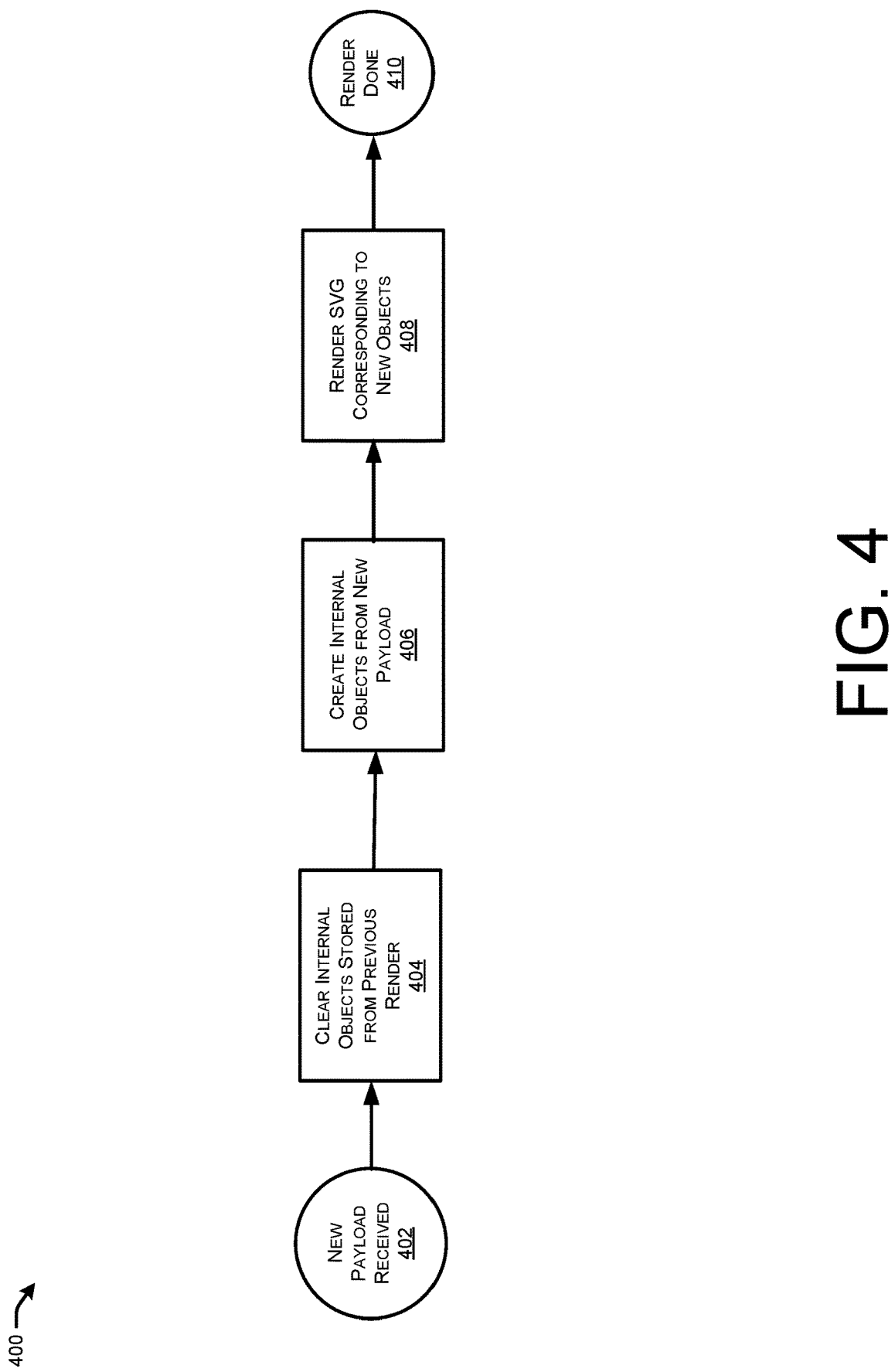
FIG. 4 schematically illustrates an example flow of drawing a network topology, using a library of graphic objects relating to a network, in accordance with the techniques and architecture described herein.

FIG. 4 schematically illustrates an example flow 400 of drawing a network topology, e.g., network topology 200, using a library of graphic objects relating to a network. At 402, a new payload (data) relating to a network is received for drawing the network topology. At 404, internal objects stored from a previous rendering of a network topology are cleared. At 406, internal objects are created from the new payload. At 408, scalable vector graphics (SVG) elements are rendered corresponding to the new internal objects. At 410, the rendering of the network topology is done.

Figure 5:
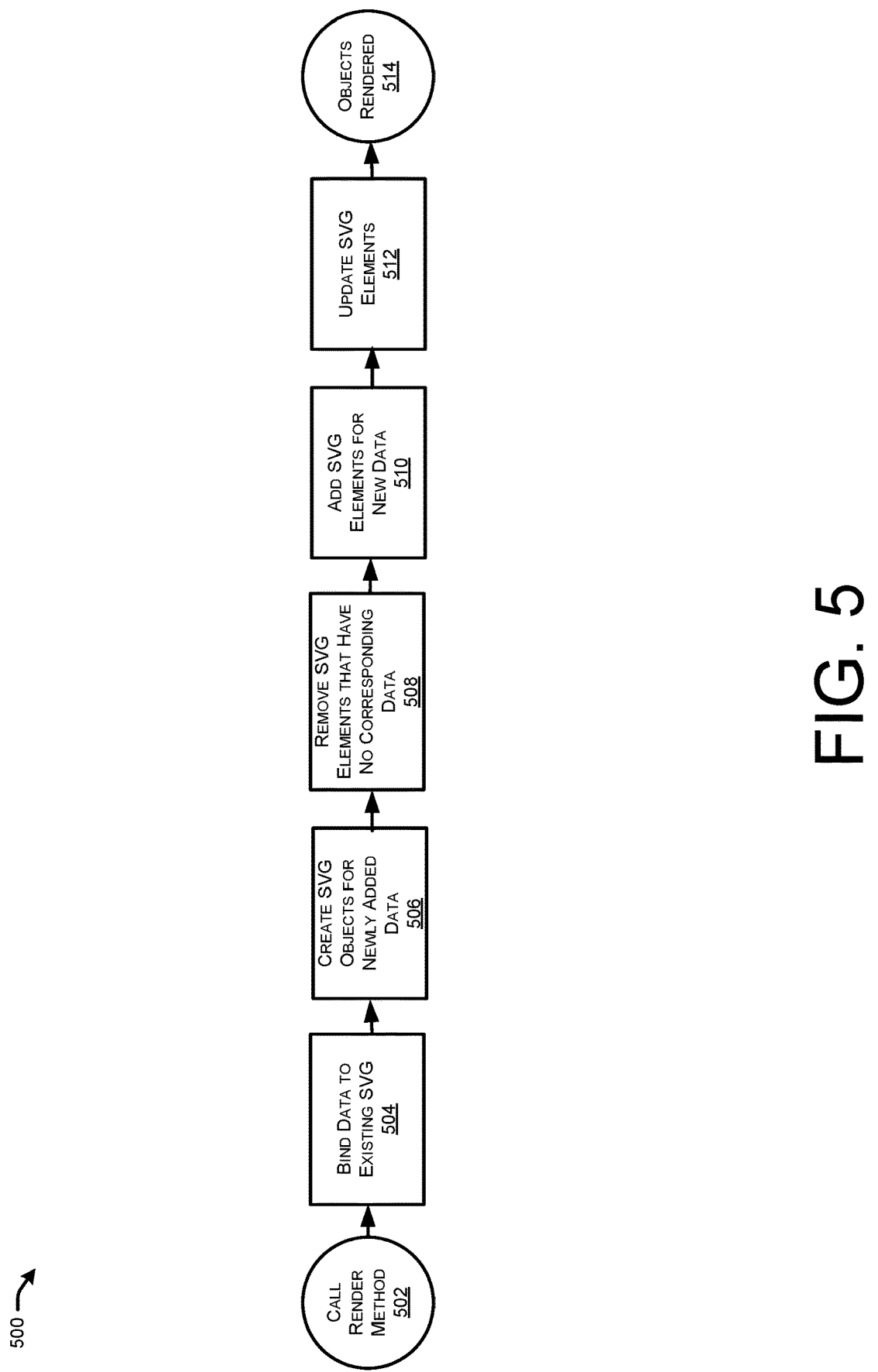
FIG. 5 schematically illustrates an example flow of rendering graphic objects, e.g., nodes, within the various levels of the network topology, in accordance with the techniques and architecture described herein.

FIG. 5 schematically illustrates an example flow 500 of rendering graphic objects, e.g., nodes, within the various levels of the network topology, e.g., network topology 200. When an indication is received from the user 114, e.g., an input signal is received from the user device 112, indicating that a different level within the network topology should be displayed. At 502 a rendering method is called. At 504, data is bound to existing SVG elements. At 506, SVG elements are created for newly added data. At 508, SVG elements that have no corresponding data within the level of the network topology are removed. At 510, the newly created SVG elements are added. At 512, already existing SVG elements are updated. At 514, the graphic objects have been rendered.

Figure 6:
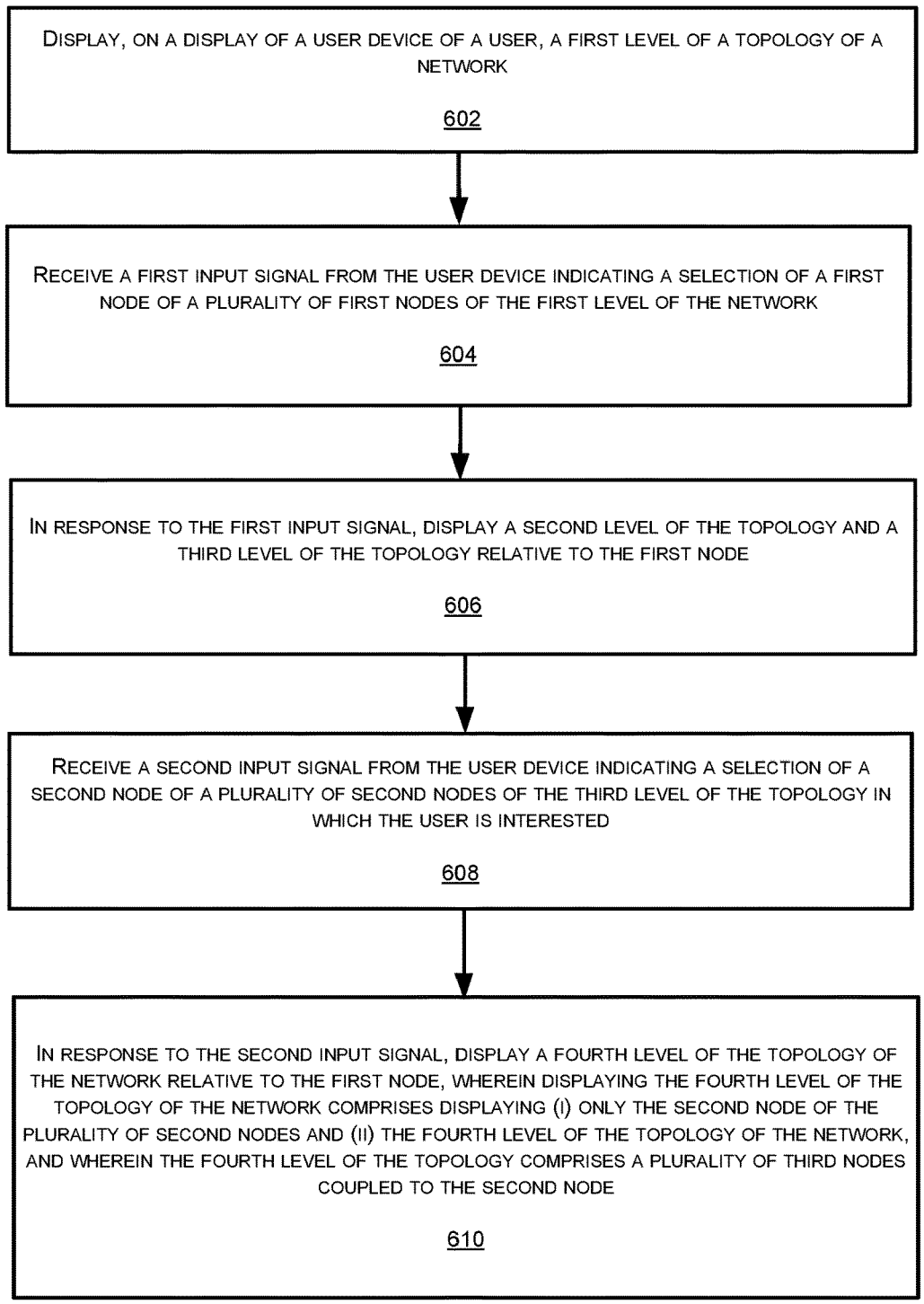
FIG. 6 illustrates a flow diagram of an example method for displaying a seamless network topology, in accordance with the techniques and architecture described herein.

FIG. 6 illustrates a flow diagram of an example method 600 and illustrates aspects of the functions performed at least partly by network devices of a network as described with respect to FIGS. 1-5. The logical operations described herein with respect to FIG. 6 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 6 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 6 illustrates a flow diagram of an example method 600 for displaying a seamless network topology, e.g., network topology 200. In some examples, the method 600 may be performed by a system comprising one or more processors and one or more non-transitory computer-readable media storing computer-executable instructions that, when executed by the one or more processors, cause the one or more processors to perform the method 600.

At 602, a display of a user device of a user displays a first level of a topology of a network. For example, a network topology 200 (e.g., seamless network topology 110) of a network, e.g., network 100, may be described and displayed on a user device, e.g., user device 112, of a user, e.g., user 114, as, for example, a network graph or topology map. The network topology 200 may display site-to-site connections 202. The site-to-site connections 202 may be with respect to one or more on-premises (on-prem) networks 204. In the example, the network topology 200 includes two on-prem networks 204a, 204b coupled by the site-to-site connections 202, with a third on-prem network 204c not connected to other on-prem networks 204 via the site-to-site connections. More or fewer on-prem networks 204 may be included in the network topology 200 depending on the network. In configurations, one or more of the on-prem networks 204 may be configured as a data center. In configurations, the network topology 200 includes a map 206 that lists the components of the network within the network topology 200 that are currently being displayed, e.g., where within the network topology 200 the user 114 currently is viewing. The network topology 200 may also include a menu 208 for selecting a format in which the network topology 200 may be displayed. The menu 208 includes Inventory, IP Connectivity, and Policy and Segmentation. The menu 208 exhibits different explicit views of topology, in which nodes represent three points of view of a network, i.e., in Inventory, nodes represent physical objects, in IP Connectivity, nodes represent logical objects, and in Policy and Segmentation, the nodes exhibit all enforced policies in the respective network.

At 604, a first input signal is received from the user device indicating a selection of a first node of a plurality of first nodes of the first level of the network. For example, the user 114 may select the first on-prem network 204a of the network topology 200 by interacting with the first on-prem network node 204a via a user interface (UI) that provides an input signal that may then display options to the user 114 on the user device 112 such as, for example, site details, a drill down function, e.g., drill down from the first on-prem network 204a within the network topology 200, mark as a favorite, etc.

At 606, in response to the second input signal, a second level of the topology and a third level of the topology are displayed relative to the first node. For example, if the user 114 selects to drill down, then the first on-prem network 204a may be displayed in greater detail. Referring to FIG. 2B, in this example, the next level of the network topology 200 may be an illustration of nodes in the form of spines 212 that are coupled to a third level in the form of leaves 214. In configurations, the second level of spines 212 may be displayed as simply a group of spines 212 that is connected to the respective leaves 214. However, in configurations, the user 114 may select, e.g., interact via the UI with the spine node 212 by clicking on the spine node 212 representing the group of spines 212, which may then expand the spines 212 into individual spines (not illustrated) with each spine 212 connected to each leaf 214. The user 114 may then interact with the four spines 212 to collapse them back into a group of spines 212, as illustrated in FIG. 2B.

At 608, a second input signal is received from the user device indicating a selection of a second node of a plurality of second nodes of the third level of the topology in which the user is interested. For example, the user 114 may select one of the leaves 214 by interacting with a leaf, e.g., leaf 214c, via a UI, which may then provide options for the user 114 such as, for example, providing leaf details, drilling down further within the network topology 200, marking as a favorite, etc. If the user 114 selects the leaf details, then details regarding the leaf 214c may be displayed to the user 114 on the user device 112. The information may display various pieces of information such as anomalies with respect to the leaf 214c, advisory levels, a number of interfaces, connectivity information, etc.

At 610, in response to the second input signal, a fourth level of the topology of the network is displayed relative to the first node, wherein displaying the fourth level of the topology of the network comprises displaying (i) only the second node of the plurality of second nodes and (ii) the fourth level of the topology of the network, and wherein the fourth level of the topology comprises a plurality of third nodes coupled to the second node. For example, if the user 114 selects to drill down from the leaf 214c, then the network topology 200 may display a fourth level of nodes 216 that are coupled to the leaf 214c. For clarity, the other leaves, e.g., the non-selected leaves 214a, 214b, and 214d, may be removed from the display of the network topology 200. In configurations, the nodes 216 coupled to the leaf 214c may represent component types. For example, node 216a may represent servers while node 216b may represent routers. Other examples of nodes may include switches, endpoints (e.g., Kubernetes), etc. Thus, in configurations, node 216c may represent switches while node 216d may represent endpoints (e.g., Kubernetes). In configurations, the number of components represented by the node 216 may be displayed.

Thus, the techniques and architecture described herein provide a network topology that provides an ability to display various nodes and connections within a network and provide information related to the nodes and connections to the user in a clear and uncluttered fashion. The techniques described herein allow for a user to select an upstream node, e.g., an on-prem network, and then examine various components within the on-prem network. Various nodes may be added and removed at various levels to help maintain the clarity and display useful information to the user. The information displayed within the network topology is thus constantly provided to the user with respect to the selected original node, e.g., the context selected by the user within the network topology for the selected on-prem network.

Figure 7:
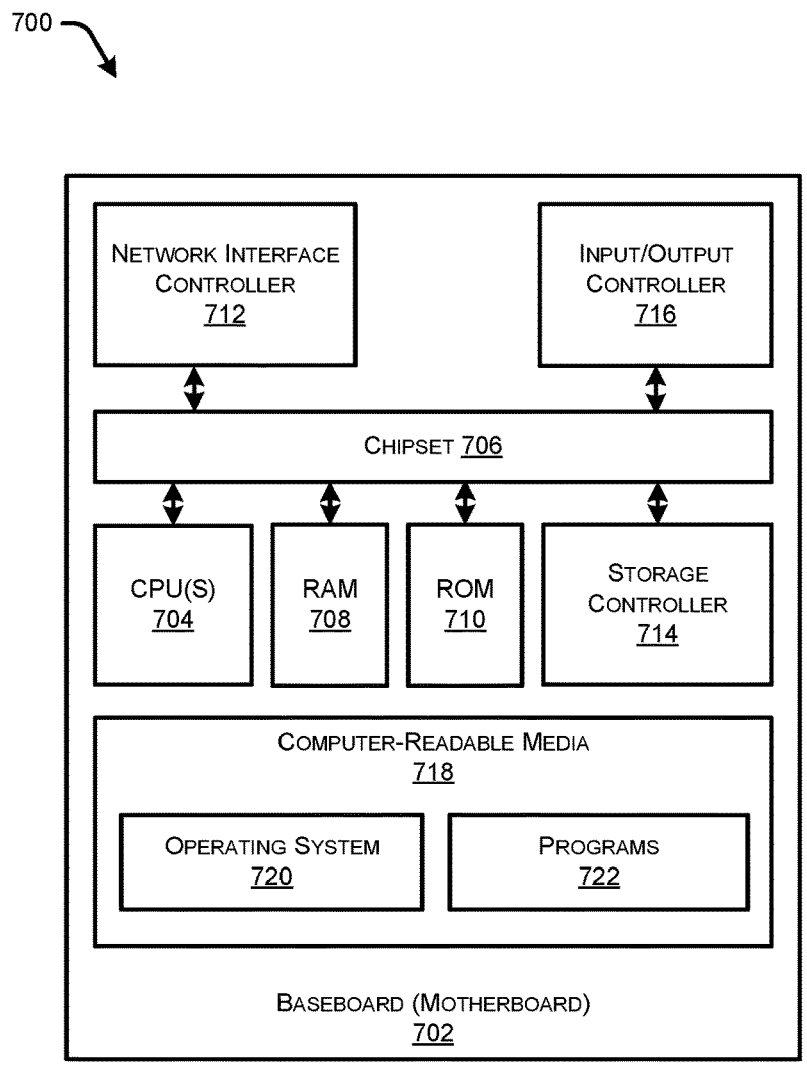
FIG. 7 is a computer architecture diagram showing an example computer hardware architecture for implementing a device that can be utilized to implement aspects of the various technologies presented herein.

FIG. 7 shows an example computer architecture for a computing device 700 capable of executing program components for implementing the functionality described above. In configurations, one or more of the computing devices 700 may be used to implement one or more of the components of FIGS. 1-5. The computer architecture shown in FIG. 7 illustrates a conventional server computer, router, switch, workstation, desktop computer, laptop, tablet, network appliance, e-reader, smartphone, or other computing device, and can be utilized to execute any of the software components presented herein. The computing device 700 may, in some examples, correspond to a physical device or resources described herein.

The computing device 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing device 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computing device 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the network 100. The chipset 706 can include functionality for providing network connectivity through a NIC 712, such as a gigabit Ethernet adapter. In configurations, the NIC 712 can be a smart NIC (based on data processing units (DPUs)) that can be plugged into data center servers to provide networking capability. The NIC 712 is capable of connecting the computing device 700 to other computing devices over networks. It should be appreciated that multiple NICs 712 can be present in the computing device 700, connecting the computer to other types of networks and remote computer systems.

The computing device 700 can include a storage device 718 that provides non-volatile storage for the computer. The storage device 718 can store an operating system 720, programs 722, and data, which have been described in greater detail herein. The storage device 718 can be connected to the computing device 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computing device 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the storage device 718 by detecting the physical states or characteristics of one or more particular locations within the physical storage units.

In addition to the mass storage device 718 described above, the computing device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 700. In some examples, the operations performed by the cloud network, and or any components included therein, may be supported by one or more devices similar to computing device 700. Stated otherwise, some or all of the operations described herein may be performed by one or more computing devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computing device 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computing device 700.

In one embodiment, the storage device 718 or other computer-readable storage media is encoded with computer-executable instructions which, when loaded into the computing device 700, transform the computer from a general-purpose computing system into a special-purpose computer capable of implementing the embodiments described herein. These computer-executable instructions transform the computing device 700 by specifying how the CPUs 704 transition between states, as described above. According to one embodiment, the computing device 700 has access to computer-readable storage media storing computer-executable instructions which, when executed by the computing device 700, perform the various processes described above with regard to FIGS. 1-6. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

The computing device 700 may support a virtualization layer, such as one or more virtual resources executing on the computing device 700. In some examples, the virtualization layer may be supported by a hypervisor that provides one or more virtual machines running on the computing device 700 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    displaying, on a display of a user device of a user, a first level of a topology of a network;
    receiving a first input signal from the user device indicating a selection of a first node of a plurality of first nodes of the first level of the topology;
    in response to the first input signal, displaying a second level of the topology and a third level of the topology relative to the first node;
    receiving a second input signal from the user device indicating a selection of a second node of a plurality of second nodes of the third level of the topology in which the user is interested; and
    in response to the second input signal, displaying a fourth level of the topology of the network relative to the first node, wherein displaying the fourth level of the topology of the network comprises displaying (i) within the third level of the topology, only the second node of the plurality of second nodes and (ii) the fourth level of the topology of the network, and wherein the fourth level of the topology comprises a plurality of third nodes coupled to the second node.

2. The method of claim 1, further comprising:
    receiving a third input signal from the user device indicating a selection of expanding the second level of the topology; and
    in response to the third input signal and within the second level of the topology, displaying only a plurality of fourth nodes of the second level that are directly coupled to the second node and their respective connections to the second node.

3. The method of claim 1, further comprising:
    receiving a third input signal from the user device indicating a selection of a third node of the plurality of third nodes of the fourth level; and
    in response to the third input signal and within a fifth level of the topology, displaying (i) only a plurality of fourth nodes of the fifth level of the topology that are directly coupled to the third node and their respective connections to the third node and (ii) within the third level of the topology, only all parent nodes of the third level directly coupled to the third node.

4. The method of claim 1, wherein:
    at least one third node of the plurality of third nodes within the fourth level of the topology represents a group of third nodes of the plurality of third nodes having a node type; and
    the method further comprises:
        receiving a third input signal from the user device indicating a selection of the at least one third node of the plurality of third nodes of the fourth level; and
        in response to the third input signal, displaying at least some of the third nodes of the group of third nodes.

5. The method of claim 1, further comprising:
    receiving a third input signal from the user device indicating a selection of a third node of the plurality of third nodes of the fourth level; and
    in response to the third input signal, displaying information related to the third node.

6. The method of claim 1, wherein:
    at least one third node of the plurality of third nodes within the fourth level of the topology represents a group of third nodes of the plurality of third nodes having a node type; and
    the method further comprises:
        receiving a third input signal from the user device indicating a selection of the at least one third node of the plurality of third nodes of the fourth level; and
        in response to the third input signal, displaying information related to the third nodes of the group of third nodes.

7. The method of claim 6, wherein the third input signal comprises an indication that a user interface (UI) provided by the user device is hovering over the at least one third node.

8. The method of claim 7, wherein the information comprises information relating to at least one of a health of the at least one third node, upstream connections, or downstream connections.

9. A system comprising:
    one or more processors; and
    one or more non-transitory computer-readable media storing computer-executable instructions that, when executed by the one or more processors, cause the one or more processors to perform actions comprising:
        displaying, on a display of a user device of a user, a first level of a topology of a network;
        receiving a first input signal from the user device indicating a selection of a first node of a plurality of first nodes of the first level of the topology;
        in response to the first input signal, displaying a second level of the topology and a third level of the topology relative to the first node;
        receiving a second input signal from the user device indicating a selection of a second node of a plurality of second nodes of the third level of the topology in which the user is interested; and
        in response to the second input signal, displaying a fourth level of the topology of the network relative to the first node, wherein displaying the fourth level of the topology of the network comprises displaying (i) within the third level of the topology, only the second node of the plurality of second nodes and (ii) the fourth level of the topology of the network, and wherein the fourth level of the topology comprises a plurality of third nodes coupled to the second node.

10. The system of claim 9, wherein the actions further comprise:
    receiving a third input signal from the user device indicating a selection of expanding the second level of the topology; and
    in response to the third input signal and within the second level of the topology, displaying only a plurality of fourth nodes of the second level that are directly coupled to the second node and their respective connections to the second node.

11. The system of claim 9, wherein the actions further comprise:
    receiving a third input signal from the user device indicating a selection of a third node of the plurality of third nodes of the fourth level; and
    in response to the third input signal and within a fifth level of the topology, displaying (i) only a plurality of fourth nodes of the fifth level of the topology that are directly coupled to the third node and their respective connections to the third node and (ii) within the third level of the topology, only all parent nodes of the third level directly coupled to the third node.

12. The system of claim 9, wherein:
at least one third node of the plurality of third nodes within the fourth level of the topology represents a group of third nodes of the plurality of third nodes having a node type; and
the actions further comprise:
receiving a third input signal from the user device indicating a selection of the at least one third node of the plurality of third nodes of the fourth level; and
in response to the third input signal, displaying at least some of the third nodes of the group of third nodes.

13. The system of claim 9, wherein the actions further comprise:
receiving a third input signal from the user device indicating a selection of a third node of the plurality of third nodes of the fourth level; and
in response to the third input signal, displaying information related to the third node.

14. The system of claim 9, wherein:
at least one third node of the plurality of third nodes within the fourth level of the topology represents a group of third nodes of the plurality of third nodes having a node type; and
the actions further comprise:
receiving a third input signal from the user device indicating a selection of the at least one third node of the plurality of third nodes of the fourth level; and
in response to the third input signal, displaying information related to the third nodes of the group of third nodes.

15. The system of claim 14, wherein the third input signal comprises an indication that a user interface (UI) provided by the user device is hovering over the at least one third node.

16. The system of claim 15, wherein the information comprises information relating to at least one of a health of the at least one third node, upstream connections, or downstream connections.

17. One or more non-transitory computer-readable media storing computer-executable instructions that, when executed by one or more processors, cause the one or more processors to perform actions comprising:
displaying, on a display of a user device of a user, a first level of a topology of a network;
receiving a first input signal from the user device indicating a selection of a first node of a plurality of first nodes of the first level of the topology;
in response to the first input signal, displaying a second level of the topology and a third level of the topology relative to the first node;
receiving a second input signal from the user device indicating a selection of a second node of a plurality of second nodes of the third level of the topology in which the user is interested; and
in response to the second input signal, displaying a fourth level of the topology of the network relative to the first node, wherein displaying the fourth level of the topology of the network comprises displaying (i) within the third level of the topology, only the second node of the plurality of second nodes and (ii) the fourth level of the topology of the network, and wherein the fourth level of the topology comprises a plurality of third nodes coupled to the second node.

18. The one or more non-transitory computer-readable media of claim 17, wherein the actions further comprise:
receiving a third input signal from the user device indicating a selection of expanding the second level of the topology; and
in response to the third input signal and within the second level of the topology, displaying only a plurality of fourth nodes of the second level that are directly coupled to the second node and their respective connections to the second node.

19. The one or more non-transitory computer-readable media of claim 17, wherein the actions further comprise:
receiving a third input signal from the user device indicating a selection of a third node of the plurality of third nodes of the fourth level; and
in response to the third input signal and within a fifth level of the topology, displaying (i) only a plurality of fourth nodes of the fifth level of the topology that are directly coupled to the third node and their respective connections to the third node and (ii) within the third level of the topology, only all parent nodes of the third level directly coupled to the third node.

20. The one or more non-transitory computer-readable media of claim 17, wherein:
at least one third node of the plurality of third nodes within the fourth level of the topology represents a group of third nodes of the plurality of third nodes having a node type; and
the actions further comprise:
receiving a third input signal from the user device indicating a selection of the at least one third node of the plurality of third nodes of the fourth level; and
in response to the third input signal, displaying at least some of the third nodes of the group of third nodes.

* * * * *